(12) United States Patent
Abida et al.

(10) Patent No.: US 11,507,091 B2
(45) Date of Patent: Nov. 22, 2022

(54) DATA SCIENCE SYSTEM FOR DEVELOPING MACHINE LEARNING MODELS

(71) Applicant: Volkswagen Group of America, Inc., Herndon, VA (US)

(72) Inventors: Mohamed Kacem Abida, Newark, CA (US); Danil Kazankov, San Mateo, CA (US)

(73) Assignees: VOLKSWAGEN AKTIENGESELLSCHAFT, Wolfsburg (DE); PORSCHE AG, Stuttgart (DE); AUDI AG, Ingolstadt (DE)

( * ) Notice: Subject to any disclaimer, the term of this patent is extended or adjusted under 35 U.S.C. 154(b) by 421 days.

(21) Appl. No.: 16/699,699

(22) Filed: Dec. 1, 2019

(65) Prior Publication Data
US 2021/0165408 A1  Jun. 3, 2021

(51) Int. Cl.
G05D 1/00 (2006.01)
G06F 16/904 (2019.01)
G06N 20/00 (2019.01)

(52) U.S. Cl.
CPC ......... G05D 1/0088 (2013.01); G06F 16/904 (2019.01); G06N 20/00 (2019.01)

(58) Field of Classification Search
CPC .... G05D 1/0088; G06F 16/904; G06N 20/00; G06K 9/6288; G06K 9/6256; G06K 9/00791; B60W 30/025
See application file for complete search history.

(56) References Cited

U.S. PATENT DOCUMENTS

| 11,113,567 B1* | 9/2021 | Durand | G06N 20/00 |
| 11,200,429 B1* | 12/2021 | Evans | G06V 20/56 |
| 2019/0047584 A1 | 2/2019 | Donnelly | |

(Continued)

FOREIGN PATENT DOCUMENTS

| CN | 110320883 A | 10/2019 | |
| WO | WO-2018218155 A1 * | 11/2018 | G01C 21/32 |

OTHER PUBLICATIONS

Samiullah "Deploying Machine Learning Models in Shadow Mode," located at https://christophergs.com/machine%20learning/2019/03/30/deploying-machine-learning-applications-in-shadow-mode, Mar. 30, 2019, pp. 1-8.

(Continued)

*Primary Examiner* — Marthe Y Marc-Coleman
(74) *Attorney, Agent, or Firm* — Womble Bond Dickinson (US) LLP

(57) ABSTRACT

In one embodiment, a method is provided. The method includes receiving sensor data generated by a set of vehicles. The method also includes performing a first set of processing operations on the sensor data. The method further includes providing an exploration interface configured to allow one or more of browsing, searching, and visualization of the sensor data. The method further includes selecting a subset of the sensor data. The method further includes performing a second set of processing operations on the subset of the sensor data. The method further includes provisioning one or more of computational resources and storage resources for developing an autonomous vehicle (AV) model based on the subset of the sensor data.

19 Claims, 13 Drawing Sheets

(56) References Cited

U.S. PATENT DOCUMENTS

2019/0147331 A1    5/2019  Arditi
2019/0325265 A1   10/2019  Lecue et al.
2020/0311616 A1* 10/2020  Rajkumar .............. G06N 5/043

OTHER PUBLICATIONS

International Search Report and Written Opinion dated Mar. 9, 2021 for International Patent Application No. PCT/EP2020/084080.

* cited by examiner

DATA SCIENCE SYSTEM FOR DEVELOPING MACHINE LEARNING MODELS

TECHNICAL FIELD

Aspects of the present disclosure relate to digital assets, and more particularly, to a data science system for developing machine learning models.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Developing these models may be an expensive and time consuming process. It may be difficult to gather training data and to clean/process the training data. It may also be difficult to select which training data should be used to train a model. Many of the processes or workflows for developing these models is manual (e.g., manually performed by a data scientist/engineer).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Developing AV models (e.g., artificial intelligence (AI) models, machine learning (ML) models, etc.) for autonomous functions are an increasingly time-consuming and difficult task. Users (e.g., data scientists and/or data engineers) may perform various functions, tasks, etc., when developing the AV models. The user may also manage the sensor data that is received from various vehicles (e.g., a fleet of vehicles). These tasks are often manually performed which is time consuming. In addition, these tasks are also prone to error because they are manually done (e.g., users may forget a task or perform a task differently).

In addition, multiple tools, applications, services, software, etc., may be used to develop an AV model. These tools, applications, services, software are often disconnected from each other and are often not compatible with each other (e.g., the output of one tool may not be usable as an input to another tool without modifying the output). Using these disparate and disconnected tools, applications, services, software, etc., further increases the time and complexity of developing AV models.

The examples, implementations, and embodiments described herein may help address these issues when developing AV models. In one embodiment, a data science system provides an end-to-end platform that supports ingesting the data, view/browsing the data, visualizing the data, selecting different sets of data, processing and/or augmenting the data, provisioning of computational and storage resources, and testing AV models. The data science system supports multiple workflows or processes within a single ecosystem/platform which allows users to transition between different phases of the development cycle more easily. The data science system also automates various tasks such as ingesting data, processing data, and/or augmenting data. This may help improve the quality of the AV models that are developed and/or may decrease the amount of time to develop the AV models.

Although the present disclosure may refer to AV models, the examples, implementations, aspects, and/or embodiments described herein may be used with other types of models (e.g., other types of machine learning models, other types of artificial intelligence models, etc.). For example, the data science system may be used to develop, modify, update, etc., a driver assistant model (e.g., a ML/AI model that may assist a driver of a vehicle with the operation of the vehicle). In another example, the data science system may be used to develop, modify, update, etc., semi-autonomous vehicle model (e.g., a ML/AI model that may partially automate one or more functions/operations of a vehicle).

Figure 1:
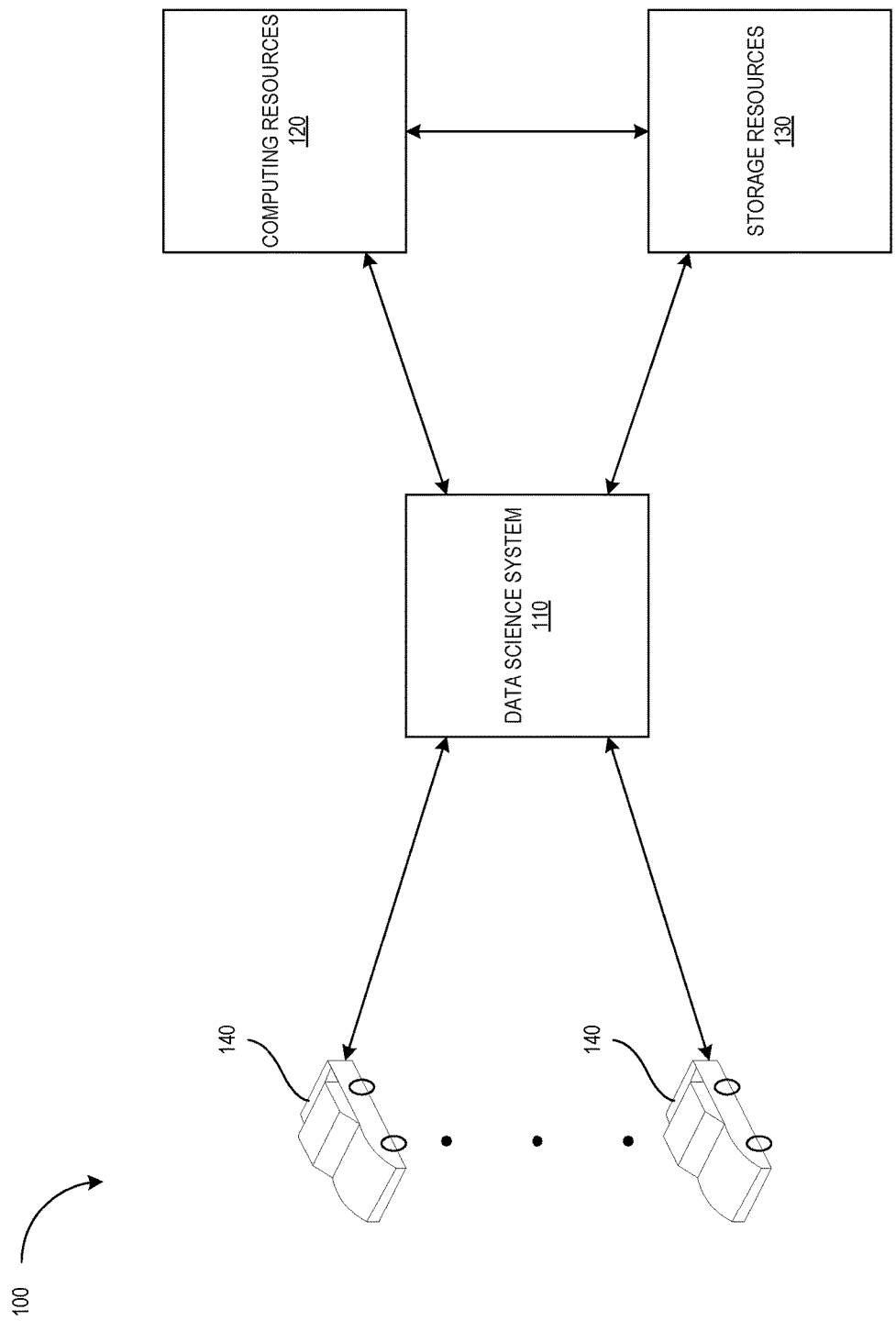
FIG. 1 is a block diagram that illustrates an example system architecture, in accordance with one or more embodiments of the present disclosure.

FIG. 1 is a block diagram that illustrates an example system architecture 100, in accordance with some embodiments of the present disclosure. The system architecture 100 includes a data science system 110, computing resources 120, storage resources 130, and vehicles 140. One or more network may interconnect the data vehicles 140, the data science system 110, the computing resources 120, and/or the storage resources 130. A network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. The network may carry communications (e.g., data, message, packets, frames, etc.) between the vehicles 140, the data science system 110, the computing resources 120 and/or the storage resources 130.

The vehicles 140 may be commercial vehicles, test vehicles, and/or may be autonomous vehicles (AVs). In one embodiment, the vehicles 140 may be a fleet of vehicles that are used to collect, capture, gather, compile, etc., sensor data and/or other data that may be used to develop, improve, refine, or enhance AV models. AV models may be ML and/or AI models that may be used to manage and/or control the operation of a vehicle. Each of the vehicles 140 may include various sensors that may generate data (e.g., sensor data) as the respective vehicle operates (e.g., drives, moves around, or is otherwise on). Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc. The sensors of the vehicles 140 may generate sensor data such as video data, image data, GPS data, LIDAR data, time series data, etc. Each of the vehicles 140 by way of its sensors may generate gigabytes (e.g., tens, hundreds, thousands, etc., of gigabytes) of data per hour of operation.

The computing resources 120 may include computing devices which may include hardware such as processing devices (e.g., processors, central processing units (CPUs), processing cores), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the data science system 110, one or more of the computing resources 120 and the storage resources 130 may be part of the data science system 110 in other embodiments. For example, the data science system 110 may include both the computing resources 120 and the storage resources 130.

As discussed above, developing AV models (e.g., artificial intelligence (AI) models, machine learning (ML) models, autonomous functions is an increasingly time-consuming and difficult task. Users (e.g., data scientists and/or data engineers) may perform various functions, tasks, etc., when developing the AV models. For example, a user may setup or configure development environments (e.g., computing devices, integrated development/programming environments, and/or software) that may be used to code, create, modify, etc., AV models. In another example, the user may configure the training environment for various AV models. In a further example, a user may perform various pre-processing tasks, such as selecting/finding data, cleaning data (e.g., converting/changing the format of the data), organizing data, etc. The user may also manage the sensor data that is received from the various vehicles 140 (e.g., a fleet of vehicles). These tasks are often manually performed which is time consuming. In addition, these tasks are also prone to error because they are manually done (e.g., users may forget a task or perform do a step different from before).

As AV models become more complex/sophisticated, more and more computing resources and/or storage resources may be used to develop the AV models and/or store the data used by the AV models (e.g., training data). For example, whole clusters or groups of computing devices (e.g., server computers, virtual machines (VMs), containers, etc.) and terabytes, petabytes, etc., of data may be used to train an AV model. In addition, a multiple AV models may be used in a single vehicle 140.

Previously, the development of AV models used various disparate and disconnected tools, applications, services, software, etc. For example, different applications may be used for data configuration management, data collection, feature extraction, data verification, resource management (e.g., storage and/or computing resource management), analysis of data, process management, etc. Using these disparate and disconnected tools, applications, services, software, etc., further increased the time and complexity of developing AV models.

In one embodiment, the data science system 110 may be an application and data-source agnostic system. For example, the data science system 110 may be able to work with a multitude of different applications, services, etc., and may be able to ingest data from various different sources of data (e.g., ingest multiple types/formats of data from multiple types and/or brands of sensors). The data science system 110 may provide a cloud-based infrastructure (e.g., computing resources 120 and/or storage resources 130) that may be tailored/customized for the development of AV models (e.g., ML models, statistical models, rule-based models, etc.). The data science system 110 may support the various workflows, processes, operations, actions, tasks, etc., in the development cycle for AV models. The development cycle for an AV model may be referred to as a loop, a development loop, a big loop, a development process, etc. The development cycle may include the ingestion of data from the vehicles 140. The data may be selected, processed, cleaned, analyzed, annotated, visualized (e.g., viewed), as discussed in more detail below. Computational resources 120 and storage resources 130 may be allocated to develop AV models using the data and/or to store modifications to the data. The AV models may be deployed in the vehicles for testing (e.g., using shadow mode as discussed in more detail below) and additional data may be collected. Other models (e.g., driver assistant models, semi-autonomous vehicle models, etc., may also be deployed in the vehicles for testing (e.g., a driver assistant model may also be run in shadow mode). The additional data may be ingested by the data science system 110 and may be used to develop further AV models or update/improve existing AV models, restarting the development cycle.

In one embodiment, data (e.g., sensor data such as CAN data, images, videos, GPS data, LIDAR data, speed, acceleration, etc.) may be received, collected, ingested, etc., from vehicles 140 (e.g., a fleet of vehicles). The data may be processed, cleaned, formatted, scrubbed, massaged, for further feature labelling, annotation, extraction, manipulation, and/or processing. Users (e.g., data scientists and/or data engineers) may be use the data science system 110 to explore the data (e.g., using a data explorer or data visualizer to search for certain types of data, metadata, annotations, etc.) and to create, test, update, and/or modify various AV models.

In one embodiment, the data science system 110 may allow users the flexibility to use and/or modify the data as needed. For example, a user may modify a copy of a set of sensor data and may use the modified set of sensor data to train one or more AV models. The trained (e.g., resulting AV model) and/or the modified set of sensor data may be stored using a version control system so that the AV model and/or the data (e.g., the modified or processed data) used to train the AV may be used or verified at a later time (e.g., to reproduce the training of the AV model).

In one embodiment, the data science system 110 may enable end-to-end development and/or testing of AV models and/or other AV functions. The data science system 110 may streamline, simplify, and/or automate (e.g., fully automate or at least partially automate) various tasks related to the development and/or testing of AV models. For example, the data science system 110 may streamline and/or automate data ingestion, data preparation, data exploration and visualization, model development, testing, training, and deployment. The data science system 110 may allow for a faster and/or more efficient development cycle (e.g., AV model or application development cycle), as discussed in more detail below. The data science system 110 may also allow AV models (e.g., AV models that have been updated, modified, etc.) to be tested in the vehicles 140 safely (e.g., shadow mode, as discuss in more detail below). This allows the data science system 110 to test new AV models using real/live data from vehicles 140 without affecting the operation of the vehicles 140 (e.g., without endangering passengers).

In one embodiment, the data science system 110 may manage the data ingestion and data storage for the data (e.g., sensor data such as LIDAR data, images, videos, CAN data, log files, traces, etc.) generated by the vehicles 140. The data science system 110 may prepare and/or pre-process the data (e.g., sensor data) that is received from the vehicles 140. For example, the data science system 110 may format the data (e.g., convert the data from one format to another). In another example, the data science system 110 may clean the data (e.g., may remove portions of the data that are not used, may convert units of measurement, etc.). The data may be prepared and/or pre-processed when the data is ingested or received by the data science system 110. In addition, a modified version of the data may also be generated when the data is ingested to allow for playback and/or viewing of the data, as discussed in more detail below. Preparing/pro-processing the data and/or generating the modified data (for playback/viewing) at ingestion may allow a multitude of users and/or AV models to leverage the time and computational resources used to prepare/pre-process the data. The original data (e.g., raw data) that was received from the vehicles 140 is also stored to maintain the original data.

In one embodiment, the data science system 110 may manage the allocation and/or use of computing resources 120 (e.g., computing clusters, server computers, VMs, containers, etc.). The computing resources 120 may be used for data transformation, feature extraction, development and testing of AV models, etc. The computing resources 120 may use various cloud service platforms (e.g., cloud computing resources).

In one embodiment, the data science system 110 may also manage the allocation and/or use of storage resources 130. The storage resources 130 may store different versions of data (e.g., different versions of sensor data) and/or different version of AV models. The different versions of data may be used to train the different versions of AV models. The data science system 110 may maintain and manage the different versions of AV models and the different versions of data used to train the AV models. This may allow a user to develop a new AV model using a previous version of data (e.g., a previous set of training data) and may allow a user to track the development of the AV model and reproduce the development/testing of the AV model.

In one embodiment, the data science system 110 may also allow a user to explore, visualize, and/or view sensor data. The data science system 110 may provide a user interface (e.g., a graphical user interface) which allows a user to stream, playback, and/or view multiple streams of sensor data simultaneously. For example, the user interface may allow a user to view videos from multiple cameras (e.g., streams of video data), view LIDAR data from one or more LIDAR sensors (e.g., streams of LIDAR data), the location of a vehicle 140 (e.g., streams of GPS data or a map) and view the speed/acceleration of the vehicle 140 (e.g., a stream of odometer data). The data science system 110 may generate the sensor data by downsampling without removing outliers or corner cases in the downsampled sensor data. This allows the data science system 110 to generate a smaller data stream to allow users to playback the data, but still allow users to see when outliers, variations, or corner cases occur in the downsampled sensor data. The data science system 110 may allow the user to zoom in or zoom out on a particular stream of data (e.g., view more samples of data per second in a stream of time series data), fast-forward or rewind a data stream, and download frames or images from specific cameras etc. The different streams of sensor data may be synchronized in time to allow the user to comprehensively visualize the state and/or operation of a vehicle 140 at different points in time.

The data science system 110 may also allow users to update, modify, improve, augment, enhance, etc., the data (e.g., sensor data) received from the vehicles 140. For example, the data science system 110 may allow users to add metadata (e.g., labels, descriptions, annotations, tags, identifiers, text, and/or other information) to the data received from the vehicle 140. In one embodiment, the data science system 110 may analyze the data to create and/or add the metadata (e.g., may automatically analyze video data to identify objects, such as trees, in the video data). In another embodiment, the data science system 110 may a third part service, application, process, etc., for generating metadata. The metadata may be time based metadata. For example, the metadata may be associated with a portion of a time period in a stream of data (e.g., in a ten second portion of video data, time series data).

In one embodiment, the data science system 110 may deploy an AV model to vehicles 140 to test the AV model (e.g., to perform experiments using the AV model). The AV model that is deployed for testing may be referred to as a test AV model. The test AV model may be a newer, updated, modified version of an existing AV model. The existing AV model may be an AV model that is currently approved for use in the vehicles 140 (e.g., an AV model that has already been test and approved). The existing AV model may be referred to as a production AV model. The test AV model may operate in parallel with the existing AV model on a vehicle 140, however, the test AV model may not be able to control and/or influence the operation of the vehicle 140. This may be referred to as running the test AV model in shadow mode, allowing the test AV model to shadow the production AV model, etc. This may allow the test AV model to receive live data (e.g., live sensor data as the vehicle 140 moves through an environment) and generate predictions, inferences, decisions, etc., based on the live data.

When a test AV model is operation in shadow mode, the vehicle 140 (e.g., a computing device, a processing device, etc., on the vehicle 140) may monitor the output of the test AV model (e.g., the decisions, inferences, predictions, actions, etc., generated by the test AV model). The vehicle 140 may determine whether the output of the test AV model deviates from a reference output (e.g., a reference decision, inference, prediction, action, etc.). For example, the vehicle 140 may determine whether the output of the test AV model deviates from a reference output by more than a threshold. If the output of the test AV model deviates from the reference output by more than the threshold, the vehicle 140 may save the sensor for a period of time before and after the deviation occurred (e.g., for thirty seconds before and thirty seconds after the deviation occurred).

In one embodiment, the vehicle 140 may use the behavior, actions, etc., of a driver of the vehicle 140 to determine whether the output of the test AV model deviates from reference (e.g., the driver of the vehicle 140 is the reference). For example, if the test AV model determines that the vehicle 140 should turn left by ten degrees and the user turns the vehicle 140 to the left by thirty degrees, the vehicle 140 may determine that the test AV model (e.g., the output of the test AV model) has deviated from the user (e.g., the reference). In another embodiment, the vehicle 140 may use the output of the production AV model to determine whether the output of the test AV model deviates from reference (e.g., the production AV model is the reference).

In one embodiment, users (e.g., data scientists/engineers) may analyze the outputs/results of AV models and/or the data ingested by the data storage system 110. The users may determine that certain types, categories, classes, etc., of data are needed for the development and/or improvement of one or more AV models. For example, the user may determine that additional videos of driving through snowy weather are needed to refine or improve an AV model. The user may provide a request to the data science system 110 for the additional videos of driving through snowy weather. The data science system 110 may forward the request to the vehicles 140. The drivers of the vehicle 140 may collect the requested videos the videos may be provided to the data science system 110. The data science system 110 may ingest, process, and enhance the data, as discussed above. After the new videos have been ingested, the user may be notified that the requested videos (e.g., new or additional sensor data) are now available for use (e.g., viewing, selection, augmentation, etc.). The user can re-train their AV model and/or perform additional experiments using the AV model and the requested videos.

As discussed above, the data science system 110 provides various functions, operations, capabilities, etc., that may be useful during the development of AV models. The data science system 110 provides an end-to-end platform for the development of AV models, starting from data ingestion all the way through testing. The data science system 110 also provides for storage and visualization of heterogeneous data (e.g., different types of sensor data). The data science system 110 allows users to organize, transform, and augment sensor data. The data science system 110 also allows users to save different versions of data so that the testing and development of the AV models can be tracked or correlated with the different version of data (e.g., which versions of data were used to train and/or test which versions of AV models). The data science system 110 also allows users to provision computational and storage resources that include custom-integrated development environments, software or tools. The single data science system 110 may streamline the development process/cycle for AV models by automating various tasks (e.g., processing or augmenting data) and seamlessly integrating the different tools, services, processes that are used at different parts of the development cycle.

Figure 2:
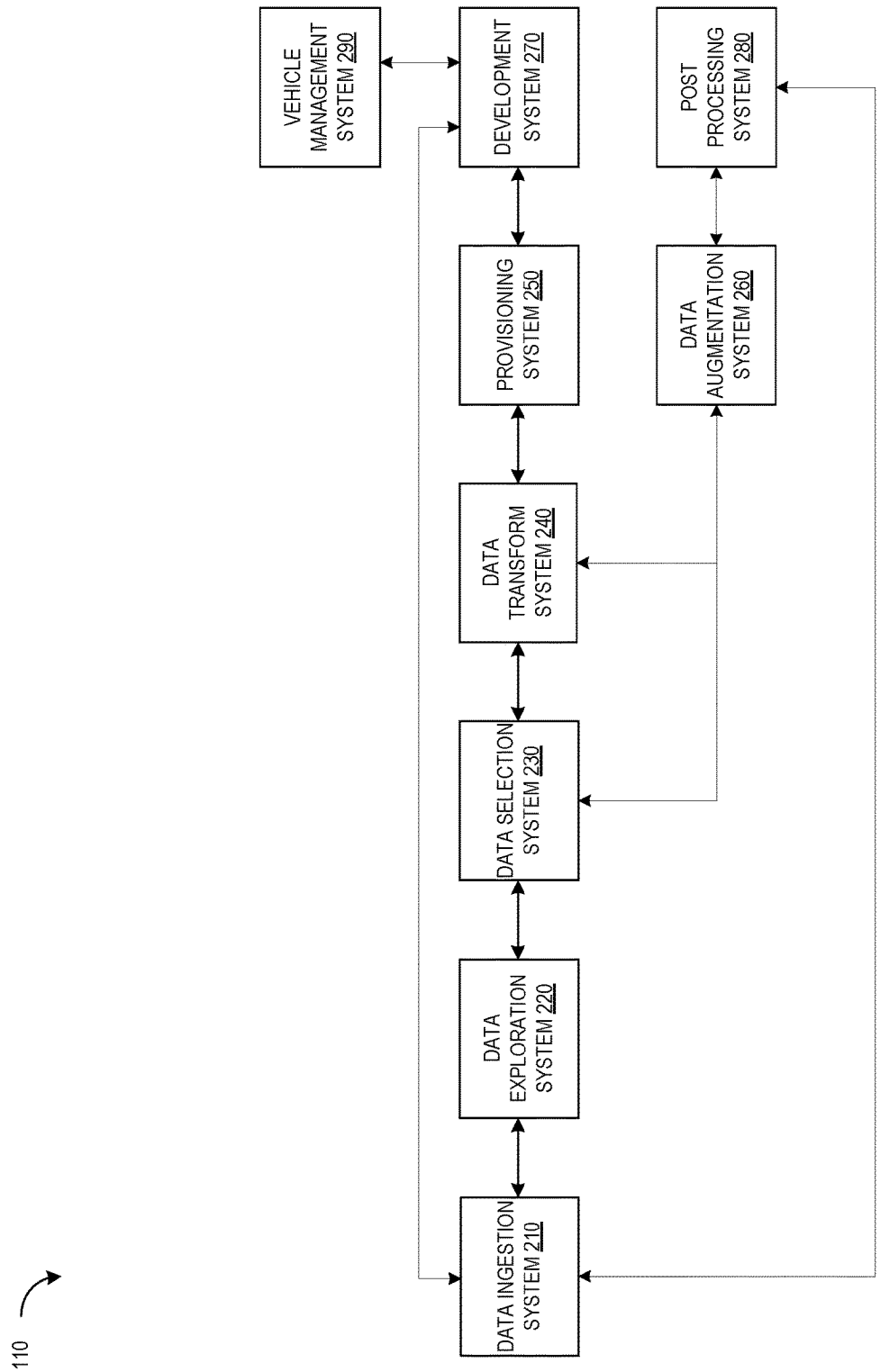
FIG. 2 is a block diagram that illustrates an example system architecture, in accordance with one or more embodiments of the present disclosure.

FIG. 2 is a block diagram that illustrates an example data science system 110, in accordance with some embodiments of the present disclosure. The data science system 110 includes a data ingestion system 210, a data exploration system 220, a data selection system 230, a data transform system 240, a provisioning system 250, a data augmentation system 260, a development system 270, a post processing system 280, and a vehicle management system 290. The data ingestion system 210, the data exploration system 220, the data selection system 230, the data transform system 240, the provisioning system 250, the data augmentation system 260, the development system 270, the post processing system 280, and the vehicle management system 290 may be interconnected via one or more or more networks (e.g., wired networks, wireless networks, etc.). Some or all of systems 210-290 may be implemented in software, hardware, firmware, or a combination thereof. For example, one or more of systems 210-290 may be installed in persistent storage device, loaded into memory, and executed by one or more processors (not shown). In another example, one or more of systems 210-290 may be processing devices, such as an application specific integrated circuit (ASIC), a field programmable gate array (FPGA), VMs, containers, etc. Some of systems 210-290 may be integrated together as an integrated component. In addition, some of systems 210-290 may be located in different computing devices (e.g., different server computers).

In one embodiment, the data ingestion system 210 may receive data that is generated, captured, gathered, etc., by various vehicles (e.g., test vehicles, such as vehicles 140 illustrated in FIG. 1). The data may be received via wireless networks (e.g., may be receive via cellular network, may be received over the air (OTA), etc.). The data may also be obtained offline. For example, data may be directly downloaded from a vehicle (e.g., from a flash drive in the vehicle) onto a storage device at a specific location (e.g., a service or body shop). The data may also be simulated data.

The data ingestion system 210 may perform various operations, functions, actions, tasks, processes, on the data that is ingested or received. For example, the data ingestion system 210 may interpret time series data (e.g., temperature readings, rotations per minute readings, etc.) and may downsample time series data. The data ingestion system may also extract frames and/or images from videos (e.g., digital videos, video streams, etc.). The images may be used to create thumbnails and/or may be fused together to create a video (e.g., an exploration or preview video) that may be used by the data exploration system 220 as discussed in more detail below. The downsampled data may also be used by the data exploration system 220 as discussed in more detail below.

The data ingestion system 210 may also perform data indexing to allow users to search for the data that was ingested. For example, the data ingestion system 210 may index the data by the type of sensor data (e.g., video data, LIDAR data, radar data, etc.), the vehicle that collected/captured the data, the time the data was captured, etc. The data ingestion system 210 may also ingest any metadata was included with the data. For example, labels, tags, annotations, etc., that were generated by the vehicle and that are associated with or accompany the data may also be processed and ingested. The data ingestion system 210 may also perform some initial enrichment or augmentation of the data. For example, the data ingestion system 210 may automatically analyze the data to add labels, tabs, annotations to the data (e.g., an image analyzer may analyze the environment depicted in an image and add a label indicating that a freeway is detected in the image).

The data ingestion system 210 may further perform version control functions for the data that is ingested and/or processed. For example, when the data is initially ingested, the original version of the data is stored to maintain a copy of the original version. The downsampled data and thumbnails (used by the data exploration system 220) are also stored as a separate version of that data, which may be leveraged by multiple users (e.g., data engineers/scientists) who want to explore the data at a later time.

The data exploration system 220 may access the data after it has been ingested and processed by the data ingestion system 210. In one embodiment, the data exploration system 220 may allow users to view the data that has been ingested by the data ingestion system 210. For example, the data exploration system 220 may provide a graphical user interface that may allow the user to browse through data that was collected over a period of time, browse certain types of data (e.g., video data, LIDAR data, data that have certain tags/annotations, etc.).

The data exploration system 220 may also allow a user to search for and/or filter out certain types of data and/or certain tags/annotations. For example, the data exploration system 220 may allow a user to search for video data that includes images of rainy weather (e.g., search or tags/annotations that indicate a video depicts rainy weather). In another example, the data exploration system 220 may allow a user to search for LIDAR data from a particular vehicle during a particular period of time.

The data exploration system 220 may also allow a user to visualize the data. The data exploration system 220 may provide a graphical user interface (GUI) that allows a user to view multiple streams of sensor data (e.g., a video, a stream of time series data, etc.), simultaneously. For example, the GUI may display multiple videos captured by multiple cameras of a vehicle. The GUI may also display a data stream that indicates the speeds of the vehicle, a data stream that indicates the angle of the steering wheel, a stream of LIDAR data, etc. The different data streams may be synchronized in time. For example, the timestamps of the videos may be synchronized with the timestamps in the streams of sensor data. This may allow the user to obtain a better understanding of the operation and/or conditions of a vehicle as time progresses. This may also allow a user to identify points in time that may be of interest and select sensor data that was generated during the points in time. For example, if the angle of the steering wheel changes rapidly at a point in time, this may indicate that an event occurred (e.g., an external event) which caused the vehicle to swerve in a direction. A user may be interested in viewing the sensor data around the time of the event to determine what happened and/or to determine whether the data would be useful in training an AV model.

The data exploration system 220 may also provide a heatmap to a user. The heatmap may indicate locations on a geographical area or geographical map where sensor data exhibits rapid, unexpected, or abnormal changes. For example, if the sensor data indicates that all vehicles that drive past a certain location on a street actuate their braking systems (e.g., apply their brakes), the heatmap may indicate this on a geographical map. This may allow a user to correlate sensor readings and the behavior of the car with geographical locations.

The data selection system 230 allows the user to select, organize, and/or split data into different data sets. For example, after viewing an hour's worth of streams of sensor data using the data exploration system 220, a user may identify certain portions of the streams of sensor data that may be useful for developing and/or modifying an AV model. The user may select different time periods from different streams of sensor data. The data selection system 230 may create new sets of data that include the selected portions of the streams. The new sets of data may also be version controlled so that other users may use the same sets of data and/or determine how the sets of data were used (e.g., which version of a set of data was used to train an AV model).

The users may also indicate a purpose for the selected data. For example, a first data set may be used for training an AV model and a second data set may be used for testing/verifying the operation of the AV model. User preferences on how data should be divided or split into data sets may also be saved and reused by other users.

The data transformation system 240 allows a user to perform additional transformations and/or processing on the data that was selected (using the data selection system 230). For example, the data transformation system 240 may allow a user to downsample data (e.g., downsample sensor readings from a rate of 60 times a second to 20 times a second). In another example, the data transformation system 240 may lower the resolution and/or framerate of a digital video.

The data transformation system 240 may also perform time synchronization for the data. For example, sensor data may have been downsampled from 60 times a second to 20 times a second. The data transformation system 240 may select downsampled the data across multiple streams of data at the same time interval (e.g., the data from all streams at time T0 is used, the data from all streams at time $1/20$ of second is used, the data from all streams at time $2/20$ of second is used, etc.).

The data transformation system 240 may also use applications or scripts to perform additional processing on the data. For example, a user may provide a script that may blur out people's faces in a video for privacy purposes. In another example, a user may provide a script that may crop out certain portions of an image. In a further example, a user may provide a script that may enhance the lighting in a digital video.

The provisioning system 250 may allocate computational resources that may be used to develop and/or test AV models. For example, the provisioning system 250 may allocate a cluster of ten server computers, or ten VMs, etc., that may be used to develop the AV model. The computational resources may be configured for specific development environments and/or may include certain applications, services, etc. For example, a particular coding tool/environment or mathematical tool/program may be included with a VM by the provisioning system 250 when the provisioning system 250 allocates the VM for a user. The computational resources may also be used to execute an AV model using training data to training the AV model. For example, multiple containers may be allocated to execute and train an AV model.

The provisioning system 250 may also allocate storage resources that maybe used to develop and/or test AV models. For example, the provisioning system 250 may allocate storage space (e.g., a folder, a set of drives, a logical storage location, etc.) to store different versions of the AV model as a user develops, refines, or modifies an AV model. Each of the versions of the AV model may be stored in allocated storage space. The storage resources may also be used to store the data sets that were selected by the data selection system 230 and/or transformed by the data transform system 240. For example, a user may select certain sets of data from sensor data receive from multiple vehicles. The selected/transformed sets of data may be stored in the allocated storage space.

In one embodiment, the computational resources may be allocated based on the location of the storage resources, or vice versa. For example, if the data sets (e.g., training data) are stored on storage devices within a particular data center, the provisioning system 250 may allocate computational resources using computing devices (e.g., server computers, VMs, containers, etc.) that also located within the same data center, or are located within a threshold distance of the data center.

The development system 270 may allow users to develop (e.g., code), refine, modify, and/or test AV models. In one embodiment, the development 270 may optionally include the computational resources and/or storage resources that were allocated by the provisioning system 250. The development system may allow a user to maintain a copy of each version of the AV model as the AV model is being developed. These different versions may be stored to allow for better tracking of the development of the AV model and to accurately reproduce the development of the AV model. The development system 270 may also allow a user to deploy an AV model to one or more vehicles. For example, the development system 270 may allow a user to deploy a new version of an AV model to a fleet of vehicles in shadow mode. This may allow the user to test the operation of the AV model using live or real-time data generated by a fleet of test vehicles, as discussed above.

The data augmentation system 260 may allow a user to further augment data. The data may be received from one or more of the data selection system 230 and the data transform system 240. For example, after a user selects a set of data using the data selection system 230, the selected set of data may be provided to the data augmentation system 260. In another example, after the data is transformed by the data transform system 240 (e.g., after the data is downsampled), the data may be provided to the data augmentation system 260. As discussed above, a user may select one or more sets of sensor data and/or transform the one or more sets of sensor data. The selected and/or transformed data may be augmented to include additional tags and/or annotations. The data augmentation system 260 may include services, processes, applications, etc., that may analyze the selected and/or transformed data to augment the data. For example, the data augmentation system 260 may include a video analysis application that may add tags/annotations indicating what features were detected in a video. The data augmentation system 260 may also interface with other or external (e.g., third party) services, processes, or applications to augment the data, which are outside of or separate from the data science system 110. For example, the data augmentation system 260 may provide the video data to a camera vendor that manufactures the camera used to generate the video data. The camera vendor may perform augmentation of the video data (e.g., add annotations and/or tags) and may transmit the data back to the data augmentation system 260. The data that is sent out of the data science system 110 for augmentation may be sent securely using encrypted communication channels (e.g., secure shell (SSH), transport later security (TSL), virtual private networks, etc.).

The post processing system 280 may receive data that has been augmented (e.g., augmented data that may include additional tags/annotations) and may perform post processing on the augmented data. For example, the post processing system 280 may convert the format of the tag/annotations to a different format. The post processing system 280 may also consolidate different tags/annotations. For example, the post processing system 280 may combine similar tags/annotations into one tag/annotation.

The vehicle management system 290 may be used to request certain types, categories, classes, etc., of data from the vehicles or drives of the vehicles. For example, a user may wish to improve the performance of an AV model when the AV model encounters an unprotected left turn on a street. The user may request sensor data (e.g., video data, LIDAR data, radar data, CAN data, etc.) that was collected while a vehicle was making an unprotected left turn. The vehicle management system 290 may receive the request and may forward the request to one or more vehicles (e.g., a fleet of test vehicles). When the users and/or vehicles collect the requested data, the users and/or vehicles may inform the vehicles management system 290. The vehicles may also provide the requested data to the data ingestion system for processing, transformation, and/or augmentation. The vehicle management system 290 may provide an indication to a user (e.g., transmit a message, an email, display an icon on a GUI etc.) to indicate that the requested data (e.g., new data) has been collected and provided to the data ingestion system 210 for ingestion. The user may use the data exploration system 220 and/or the data selection system 230 to select the new data and may use new data to refine or modify the AV model.

Figure 3:
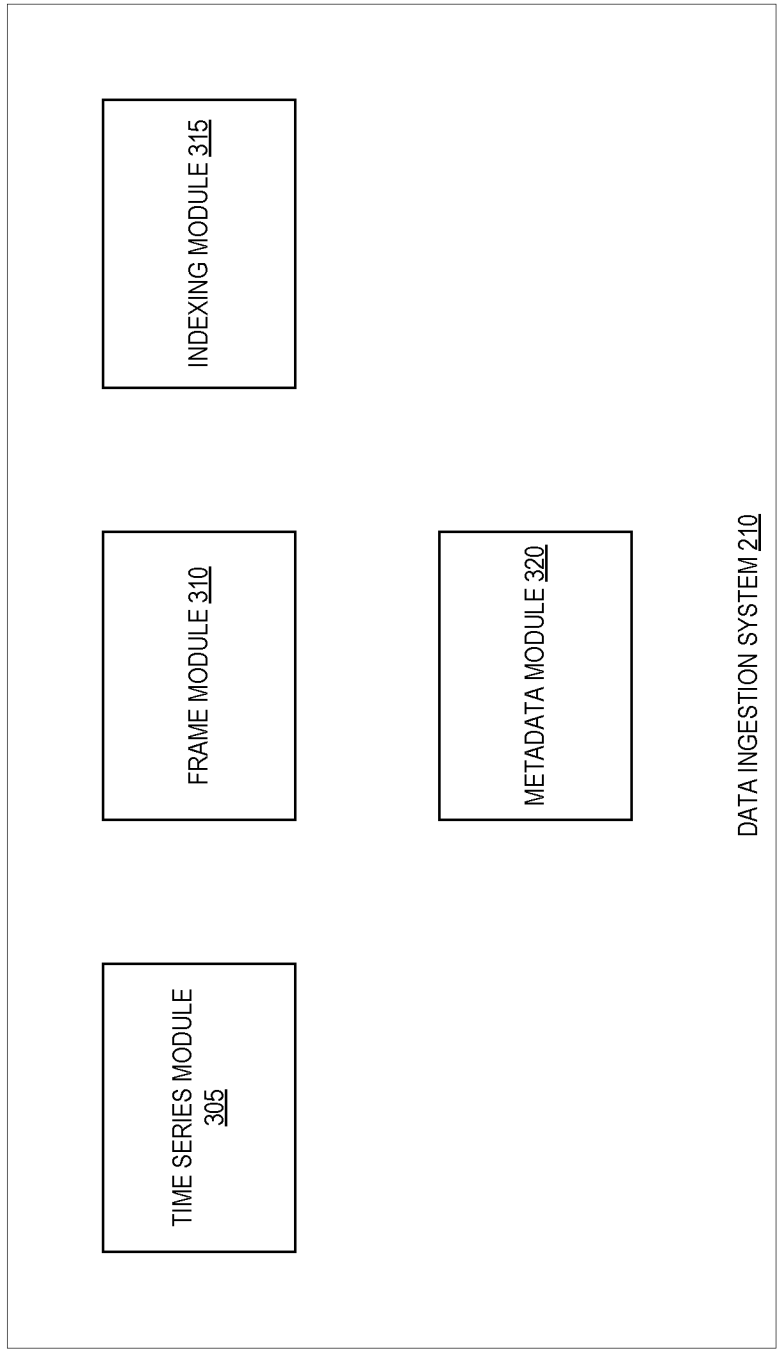
FIG. 3 is a block diagram that illustrates an example data ingestion system, in accordance with one or more embodiments of the present disclosure.

FIG. 3 is a block diagram that illustrates an example data ingestion system 210, in accordance with one or more embodiments of the present disclosure. The data ingestion system 210 includes a time series module 305, a frame module 310, an indexing module 315, and a metadata module 320. Some or all of modules 305-320 may be implemented in software, hardware, firmware, or a combination thereof.

The time series module 305 may interpret time series data and may downsample time series data, as discussed above. The frame module 310 may extract frames and/or images from videos. As discussed above, the downsampled data and/or extracted frames may be used to provide a visualization of the data, as discussed above. The indexing module 315 may perform data indexing to allow users to search for the data that was ingested (e.g., index by the type of sensor data, time collected, vehicle, etc. The metadata module 320 may ingest any metadata that was included with the data. For example, the metadata module 320 may analyze the metadata that is associated with and/or part of the data. The metadata may be converted from one format to another format.

Figure 4:
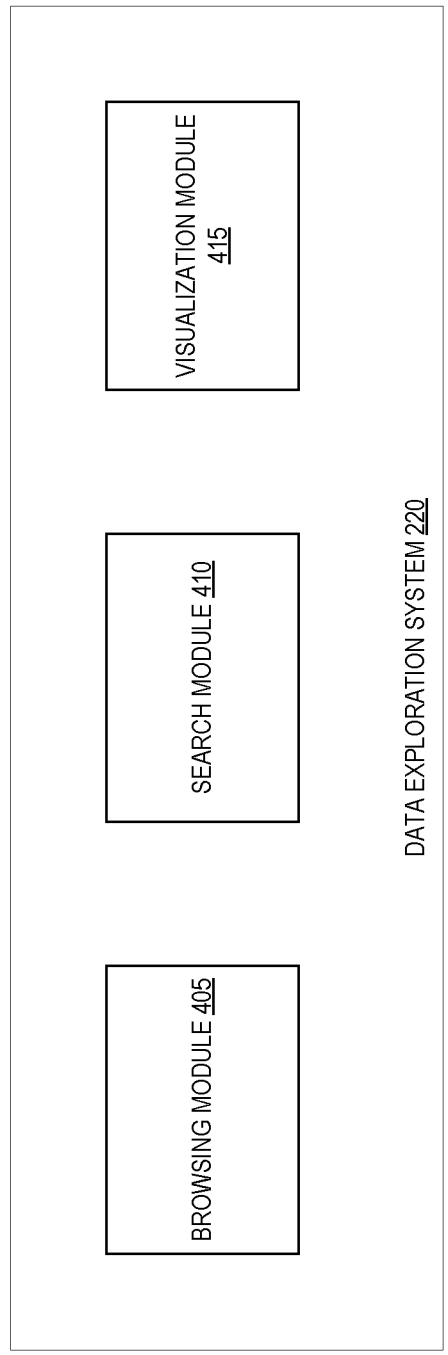
FIG. 4 is a block diagram that illustrates an example data exploration system, in accordance with one or more embodiments of the present disclosure.

FIG. 4 is a block diagram that illustrates an example data exploration system 220, in accordance with one or more embodiments of the present disclosure. The data exploration system 220 includes a browsing module 405, a search module 410, visualization module 415. Some or all of modules 405-415 may be implemented in software, hardware, firmware, or a combination thereof. The browsing module 405 may allow a user to browse through data that was collected over a period of time and/or browse certain types of data. The search module may allow a user to search for and/or filter out certain types of data and/or certain tags/annotations. The visualization module may allow a user to visualize and/or view multiple streams of data simultaneously. The visualization module may also provide a heatmap that is associated with the streams of data.

Figure 5:
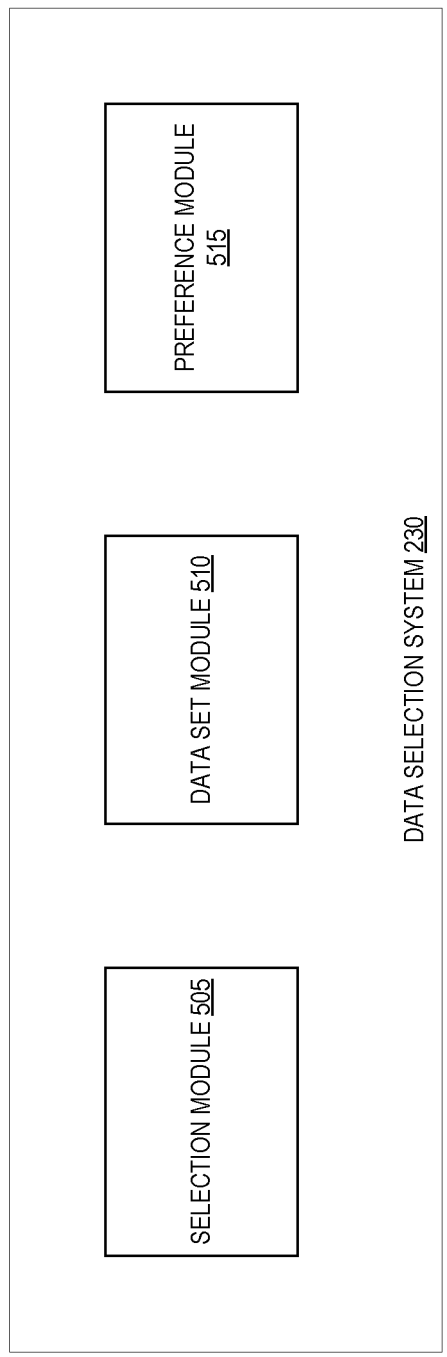
FIG. 5 is a block diagram that illustrates an example data selection system, in accordance with one or more embodiments of the present disclosure.

FIG. 5 is a block diagram that illustrates an example data selection system 230, in accordance with one or more embodiments of the present disclosure. The data selection system 230 includes a selection module 505, a data set module 510, and a preference module 515. Some or all of modules 505-515 may be implemented in software, hardware, firmware, or a combination thereof.

The selection module may allow a user to select, organize, and/or split data into different data sets. The data set module 510 may create new sets of data that include the selected portions of the streams. The new sets of data may also be version controlled, as discussed above. The preference module 515 may allow a user to indicate and save preferences on how data should be divided into sets and what purpose the data may be used for.

Figure 6:
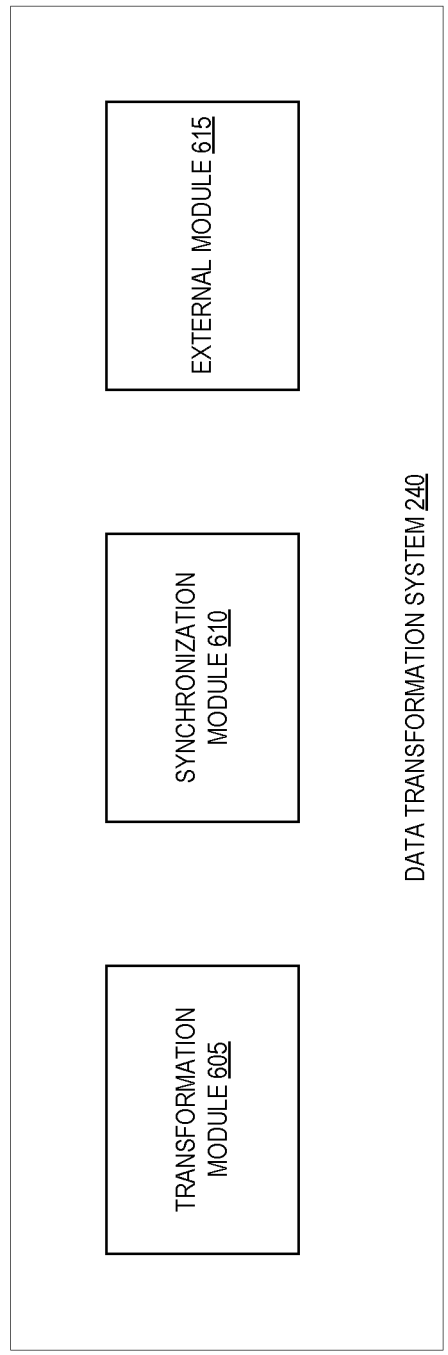
FIG. 6 is a block diagram that illustrates an example data transform system, in accordance with one or more embodiments of the present disclosure.

FIG. 6 is a block diagram that illustrates an example data transformation system 240, in accordance with one or more embodiments of the present disclosure. The data transformation system 240 includes a transformation module 605, a synchronization module 610, and an external module 615. Some or all of modules 605-615 may be implemented in software, hardware, firmware, or a combination thereof.

The transformation module 605 may perform additional transformations and/or processing (e.g., lower the resolution of an image) on the data that was selected by a user. The synchronization module 610 may also perform time synchronization for the data. The external module 615 may include user applications or scripts that may perform additional processing on the data.

Figure 7:
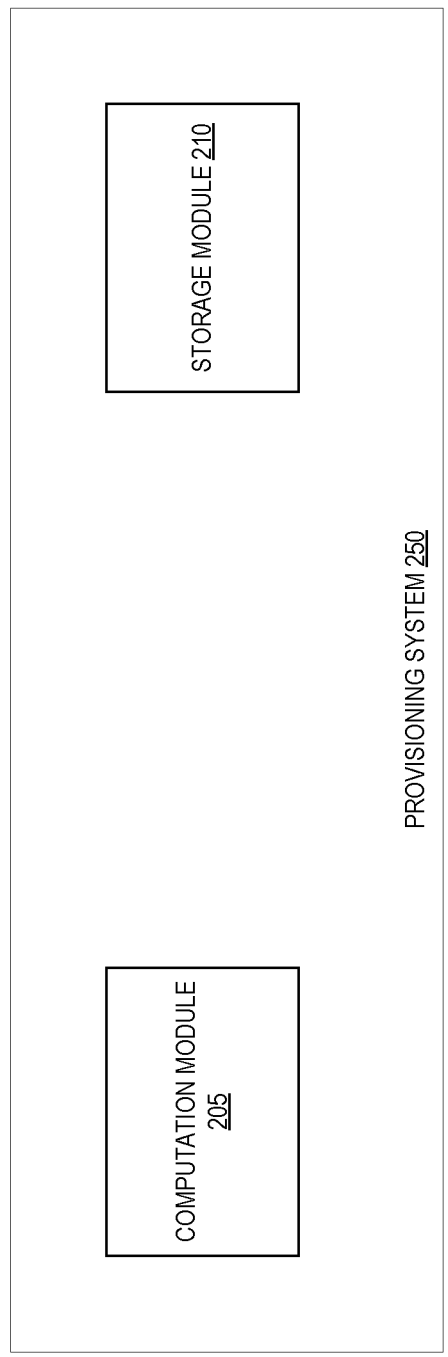
FIG. 7 is a block diagram that illustrates an example provisioning system, in accordance with one or more embodiments of the present disclosure.

FIG. 7 is a block diagram that illustrates an example provisioning system 250, in accordance with one or more embodiments of the present disclosure. The provisioning system 250 includes a computation module 705 and a storage module 710. Some or all of modules 705-710 may be implemented in software, hardware, firmware, or a combination thereof.

The computational module 705 may allocate computational resources that may be used to develop and/or test AV models. The computational module 705 may also deallocate the computational resources once a user is done using the resources. The storage module 710 may allocate storage resources that may be used to store versions of an AV model and/or data sets used by train and/or test the AV model. The storage module 710 may also deallocate the storage resources (e.g., release storage space) once the user is done using the resources.

Figure 8:
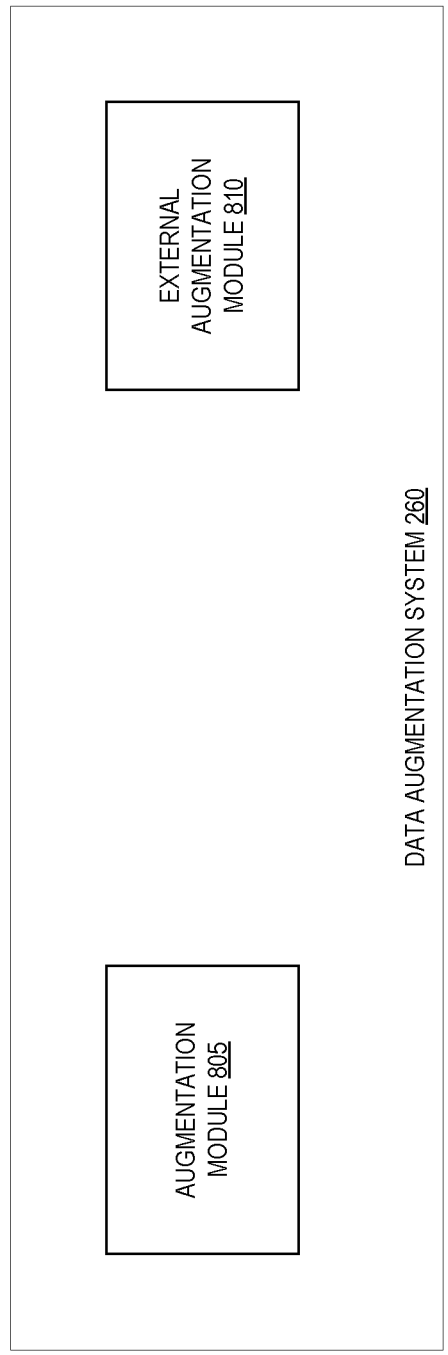
FIG. 8 is a block diagram that illustrates an example data augmentation system, in accordance with one or more embodiments of the present disclosure.

FIG. 8 is a block diagram that illustrates an example data augmentation system 260, in accordance with one or more embodiments of the present disclosure. The data augmentation system 260 includes an augmentation module 805 and an external augmentation module 810. Some or all of modules 805-810 may be implemented in software, hardware, firmware, or a combination thereof.

As discussed above, a user may select one or more sets of sensor data and/or transform the one or more sets of sensor data. The augmentation module 805 may augment the selected/transformed data to include additional tags and/or annotations. The augmentation module 805 may include services, processes, applications, etc., that may analyze the selected and/or transformed data to augment the data. The external augmentation module 810 may interface or communicate with other (e.g., third party) services, processes, or applications to augment the data. The external augmentation module 810 may setup a secure communication channel to communicate with the other services, processes, or applications.

Figure 9:
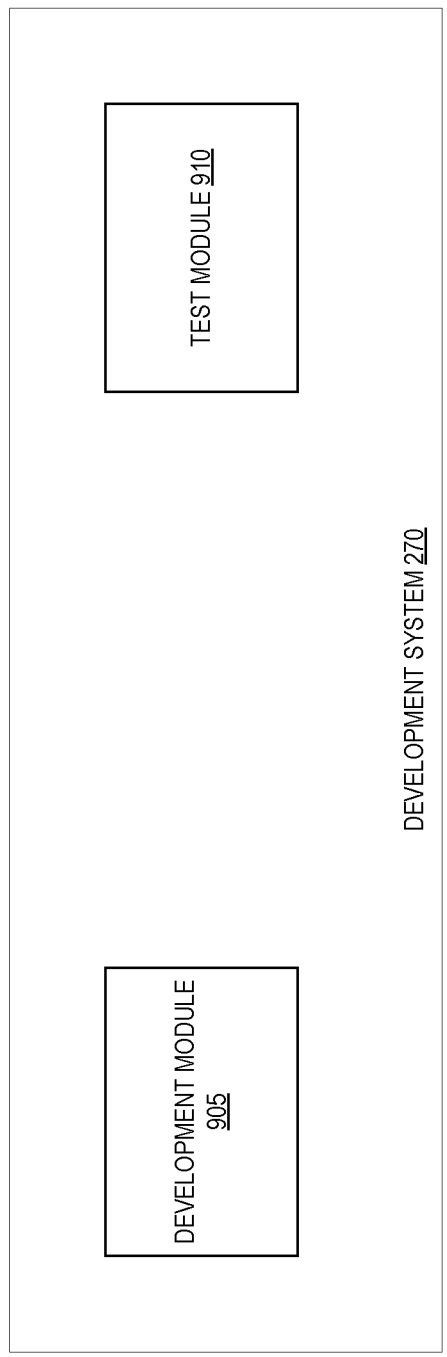
FIG. 9 is a block diagram that illustrates an example development system, in accordance with one or more embodiments of the present disclosure.

FIG. 9 is a block diagram that illustrates an example development system 270, in accordance with one or more embodiments of the present disclosure. The development system 270 includes a development module 905 and a test module 910. Some or all of modules 905-910 may be implemented in software, hardware, firmware, or a combination thereof.

The development module 905 may allow users to develop (e.g., code), refine, modify, and/or test AV models. For example, the development module 905 may include computing devices, virtual machines, integrated development environments (IDEs), etc. the test module 910 may allow users to test and/or train AV models using training or test data. The development module 905 and/or the test module 910 may include computational and/or storage resources.

Figure 10:
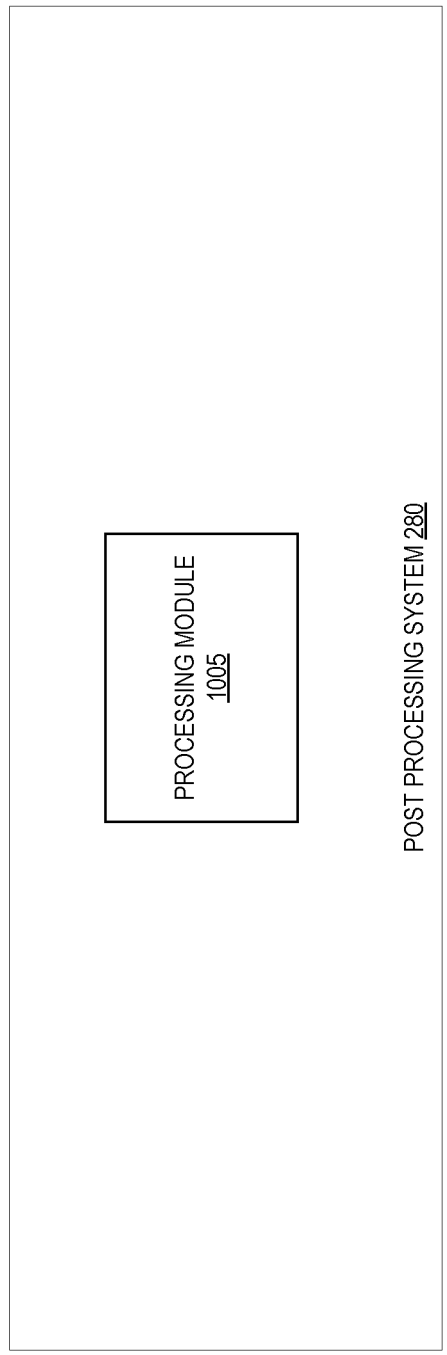
FIG. 10 is a block diagram that illustrates an example post processing system, in accordance with one or more embodiments of the present disclosure.

FIG. 10 is a block diagram that illustrates an example post processing system 280, in accordance with one or more embodiments of the present disclosure. The post processing system 280 includes a processing module 1005. The processing module 1005 may be implemented in software, hardware, firmware, or a combination thereof. The processing module 1005 may receive data that has been augmented and may perform post processing on the augmented data (e.g., may convert tags/annotations to different formats, may consolidate tags/annotations, etc.).

Figure 11:
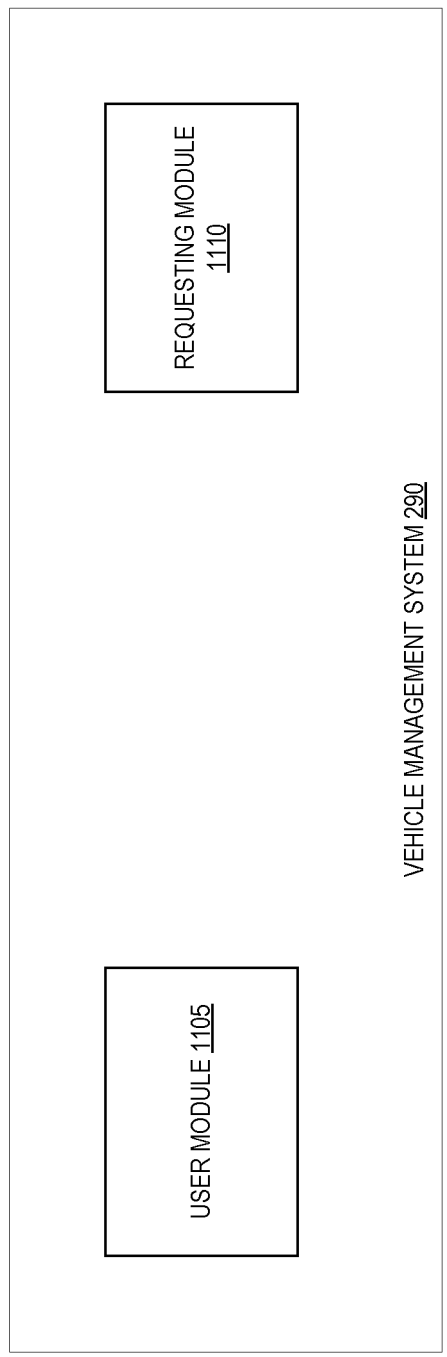
FIG. 11 is a block diagram that illustrates an example vehicle management system, in accordance with one or more embodiments of the present disclosure.

FIG. 11 is a block diagram that illustrates an example vehicle management system 290, in accordance with one or more embodiments of the present disclosure. The vehicle management system 290 includes a user module 1105 and a requesting module 1110. Some or all of modules 1105-1110 may be implemented in software, hardware, firmware, or a combination thereof.

The user module 1105 may receive requests from users to request certain types, classes, categories, etc., of data. For example, the user module may provide a user interface for the user to indicate different types of data. The requesting module 1110 may forward the request to one or more vehicles. When the vehicles provide the requested data to the data science system, the requesting module 1110 may inform the user that the requested data has been ingested and is ready for viewing, selecting, augmenting, etc.

Figure 12:
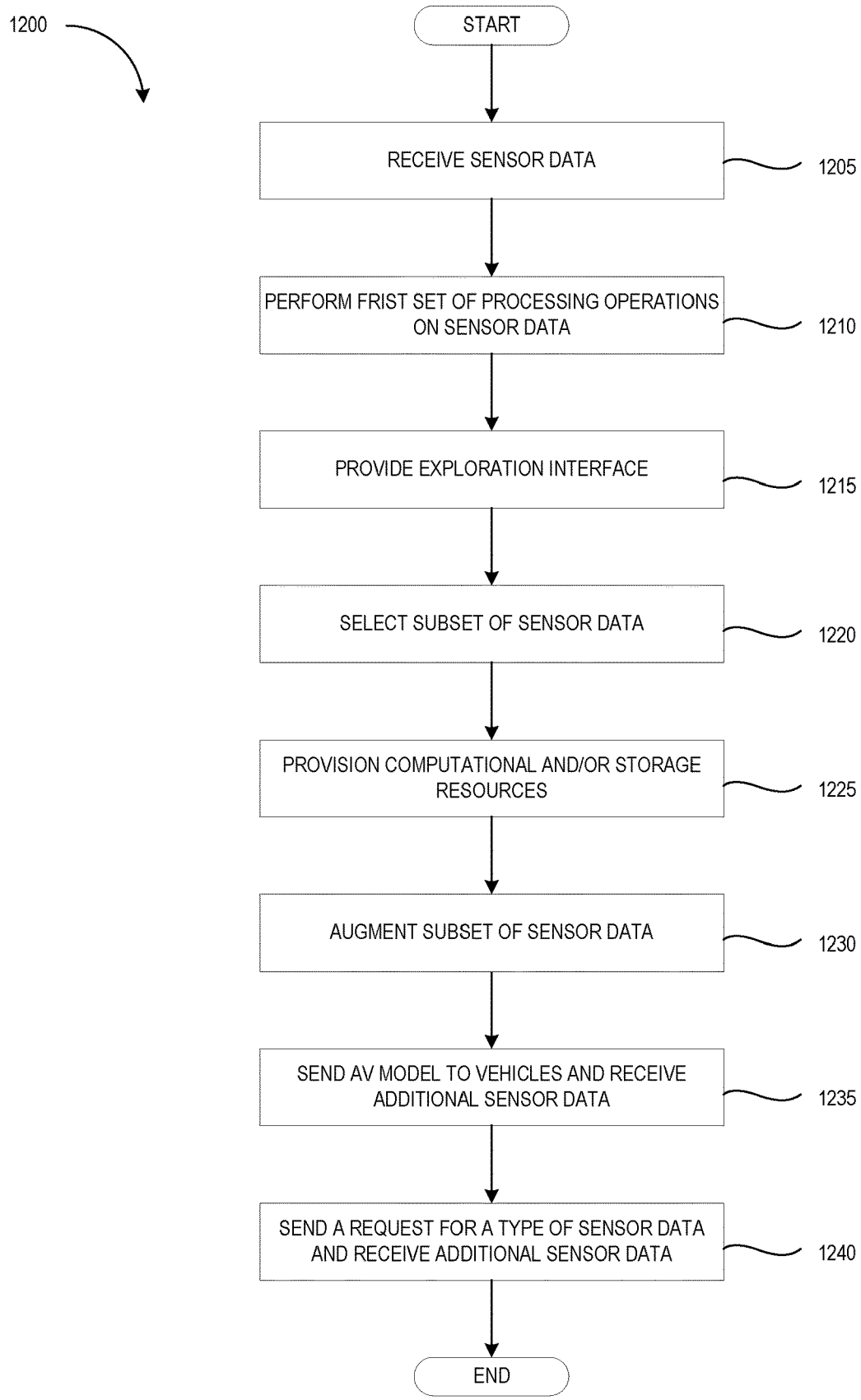
FIG. 12 is a flow diagram of a process for developing an autonomous vehicle (AV) model, in accordance with one or more embodiments of the present disclosure.

FIG. 12 is a flow diagram of a process 1200 for developing an autonomous vehicle (AV) model. Process 1200 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the method 1200 may be performed by a data science system and/or components/sub-systems of a data science system, as illustrated in FIGS. 2-11.

The process 1200 starts at block 1205 where the process 1200 receives (e.g., ingests) sensor data. For example, the sensor data may be received via wireless communications or directly for a vehicle (e.g., downloaded from the vehicle via a cable). A first set of processing operations may be performed on the sensor data at block 1210. For example, the sensor data may be downsampled, indexed, etc. Metadata may be added to or associated with the sensor data. At block 1215, an exploration interface (e.g., a user interface, a graphical user interface) may be provided to a user. The exploration interface may allow a user to browse and/or view multiple streams of data simultaneously. The exploration interface may also allow the user to provide user input identifying a subset of the sensor data. At block 1220, the process 1200 may select the subset of the sensor data based on the user input (e.g., may select sensor data between a certain time period and/or from certain sensors). At block 1225, the process 1200 may provision computational resources and/or storage resources. At block 1230, the process 1200 may optionally augment the subset of sensor data (e.g., may provide the subset of sensor data to an external computing device for augmentation). At block 1235, the process 1200 may send the AV model to one or more vehicles for testing (e.g., to run the AV model in shadow mode on the vehicles). The process 1200 may also receive additional sensor data when the output of the AV model deviates from a reference. At block 1240, the process 1200 may optionally send a request for a type of sensor data to the vehicles and may receive additional sensor data that matches the requested type.

Figure 13:
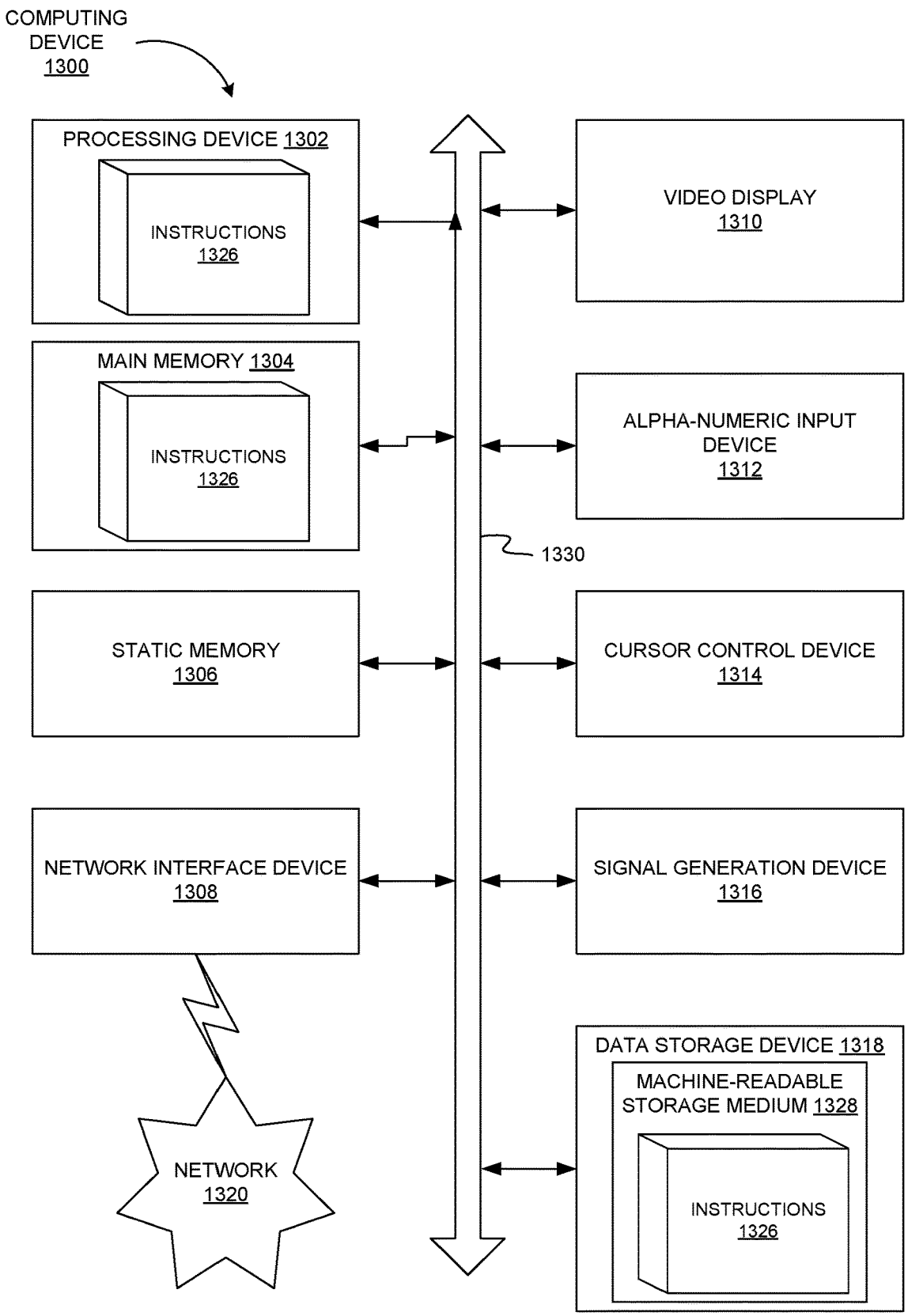
FIG. 13 is a block diagram of an example computing device that may perform one or more of the operations described herein, in accordance with some embodiments of the present disclosure.

FIG. 13 is a block diagram of an example computing device 1300 that may perform one or more of the operations described herein, in accordance with some embodiments. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device (e.g., a general purpose processor, a PLD, etc.) 1302, a main memory 1304 (e.g., synchronous dynamic random access memory (DRAM), read-only memory (ROM)), a static memory 1306 (e.g., flash memory and a data storage device 1318), which may communicate with each other via a bus 1330.

Processing device 1302 may be provided by one or more general-purpose processing devices such as a microprocessor, central processing unit, or the like. In an illustrative example, processing device 1302 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also comprise one or more special-purpose processing devices such as an application specific integrated circuit (ASIC), a field programmable gate array (FPGA), a digital signal processor (DSP), network processor, or the like. The processing device 1302 may be configured to execute the operations described herein, in accordance with one or more aspects of the present disclosure, for performing the operations and steps discussed herein.

Computing device 1300 may further include a network interface device 1308 which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and an acoustic signal generation device 1316 (e.g., a speaker). In one embodiment, video display unit 1310, alphanumeric input device 1312, and cursor control device 1314 may be combined into a single component or device (e.g., an LCD touch screen).

Data storage device 1318 may include a computer-readable storage medium 1328 on which may be stored one or more sets of instructions, e.g., instructions for carrying out the operations described herein, in accordance with one or more aspects of the present disclosure. Instructions 1326 implementing the different systems described herein (e.g., the data science system 110, the data ingestion system 210, the data exploration system 220, the data selection system 230, the data transform system 240, the provisioning system 250, the data augmentation system 260, the development system 270, the post processing system 280, and/or the vehicle management system 290 illustrated in FIGS. 2-11) may also reside, completely at least partially, within main memory 1304 and/or within processing device 1302 during execution thereof by computing device 1300, main memory 1304 and processing device 1302 also constituting computer-readable media. The instructions may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "performing," "providing," "selecting," "provisioning," "generating," "augmenting," "transmitting," "receiving," "forwarding," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving sensor data generated by a set of vehicles;
performing a first set of processing operations on the sensor data;
providing an exploration interface configured to allow one or more of browsing, searching, and visualization of the sensor data;
selecting a subset of the sensor data;
performing a second set of processing operations on the subset of the sensor data; developing an autonomous vehicle (AV) model or a driver assistant model based on the subset of the sensor data;
sending the AV model or the driver assistant model to a set of vehicles, wherein each vehicle of the set of vehicles executes the AV model or the driver assistant model in parallel with an existing AV model or an existing driver assistant model; and
receiving additional sensor data from the plurality of vehicles, wherein the additional sensor data is obtained based on a deviation between an output of the AV model or the driver assistant model, and a reference.

2. The method of claim 1, performing the first set of processing operations comprises:
generating a second version of the sensor data, wherein the second version of the sensor data is used for visualization of the sensor data.

3. The method of claim 1, further comprising:
providing a user interface to allow a user to provide user input, wherein the subset of the sensor data is selected based on the user input.

4. The method of claim 1, further comprising:
augmenting the subset of sensor data with one or more of annotations, tags, and labels, wherein augmenting the subset of sensor data comprises:
transmitting the subset of sensor data to a server computer for augmentation via a secure communication channel; and
receiving one or more of the annotations, the tags, and the labels from the server computer.

5. The method of claim 1, wherein the computational resources are provisioned to train the AV model or the driver assistant model using the subset of the sensor data.

6. The method of claim 1, wherein the computational resources are provisioned to test the AV model or the driver assistant model using the subset of the sensor data.

7. The method of claim 1, wherein the storage resources are provisioned to store different versions of the AV model or the driver assistant model.

8. The method of claim 1 wherein the storage resources are provisioned to store different versions of the subset of the sensor data.

9. The method of claim 1, further comprising:
receiving a request for a first type of sensor data;
forwarding the request for the first type of sensor data to the plurality of vehicles; and
receiving additional sensor data from the plurality of vehicles, wherein the additional sensor data is of the first type.

10. The method of claim 1, further comprising re-training the AV model or the driver assistant model based on the received additional sensor data.

11. The method of claim 1, wherein the received additional sensor data include sensor data for a period of time before and after the deviation occurred.

12. The method of claim 1, wherein the reference is at least one of the behavior and actions of a driver of the respective vehicle.

13. The method of claim 1, wherein the reference is the existing AV model or the existing driver assistant model of the respective vehicle.

14. The method of claim 1, wherein the existing AV model or the existing driver assistant model has already been tested and approved for use in the vehicles and the AV model or the driver assistant model sent to the set of vehicles is at least one of a newer, updated or modified version of the existing AV model or the existing driver assistant model, respectively.

15. A system, comprising:
a data ingestion system configured to receive sensor data generated by a set of vehicles and perform a first set of processing operations on the sensor data;
a data exploration system configured to provide an exploration interface to allow one or more of browsing, searching, and visualization of the sensor data;
a data selection system configured to select a subset of the sensor data;
a data transform system configured to perform a second set of processing operations on the subset of the sensor data;
a development system configured to transmit an AV model or a driver assistant model to a set of vehicles, wherein each vehicle of the set of vehicles executes the AV model or the driver assistant model in parallel with an existing AV model or an existing driver assistant model; and
wherein the data ingestion system is further configured to receive additional sensor data from the plurality of vehicles, wherein the additional sensor data is obtained based on a deviation between an output of the AV model or the driver assistant model, and a reference.

16. The system of claim 15, wherein the data selection system is further configured to provide a user interface to allow a user to provide user input, wherein the subset of the sensor data is selected based on the user input.

17. The system of claim 15, further comprising:
a data augmentation system configured to augment the subset of sensor data with one or more of annotations, tags, and labels, wherein to augment the subset of sensor data the data augmentation system is further configured to:
transmit the subset of sensor data to a server computer for augmentation via a secure communication channel; and
receive one or more of the annotations, the tags, and the labels from the server computer.

18. The system of claim 15, further comprising a vehicle management system configured to:
receive a request for a first type of sensor data;
forward the request for the first type of sensor data to the plurality of vehicles; and
receive additional sensor data from the plurality of vehicles, wherein the additional sensor data is of the first type.

19. A non-transitory computer-readable storage medium including instructions that, when executed by a computer processing device, cause the computer processing device to perform operations comprising:
receiving sensor data generated by a set of vehicles;

performing a first set of processing operations on the sensor data;
providing an exploration interface configured to allow one or more of browsing, searching, and visualization of the sensor data;
selecting a subset of the sensor data;
performing a second set of processing operations on the subset of the sensor data; and developing an autonomous vehicle (AV) model based on the subset of the sensor data;
sending the AV model or the driver assistant model to a set of vehicles, wherein each vehicle of the set of vehicles executes the AV model or the driver assistant model in parallel with an existing AV model or an existing driver assistant model; and
receiving additional sensor data from the plurality of vehicles, wherein the additional sensor data is obtained based on a deviation between an output of the AV model or the driver assistant model, and a reference.

* * * * *